United States Patent
Ueno

(10) Patent No.: US 10,229,446 B2
(45) Date of Patent: Mar. 12, 2019

(54) PAYMENT APPARATUS, PAYMENT SYSTEM, AND PROGRAM

(71) Applicant: TOSHIBA TEC KABUSHIKI KAISHA, Tokyo (JP)

(72) Inventor: Tomoki Ueno, Shizuoka (JP)

(73) Assignee: Toshiba TEC Kabushiki Kaisha, Tokyo (JP)

(*) Notice: Subject to any disclaimer, the term of this patent is extended or adjusted under 35 U.S.C. 154(b) by 269 days.

(21) Appl. No.: 15/208,979

(22) Filed: Jul. 13, 2016

(65) Prior Publication Data

US 2017/0032441 A1 Feb. 2, 2017

(30) Foreign Application Priority Data

Jul. 27, 2015 (JP) ................................. 2015-147672

(51) Int. Cl.
   *G06Q 30/00* (2012.01)
   *G06Q 30/06* (2012.01)
   *G06Q 10/08* (2012.01)
   *G06Q 20/20* (2012.01)

(52) U.S. Cl.
   CPC ..... *G06Q 30/0627* (2013.01); *G06Q 10/0875* (2013.01); *G06Q 20/20* (2013.01)

(58) Field of Classification Search
   CPC .................................................. G06Q 30/06
   USPC ........................................................ 705/26.1
   See application file for complete search history.

(56) References Cited

U.S. PATENT DOCUMENTS

| | | |
|---|---|---|
| 9,747,632 B2 | 8/2017 | Hicks et al. |
| 2003/0078843 A1 | 4/2003 | Sone |
| 2012/0136736 A1* | 5/2012 | Edwards ............ G06Q 20/202 705/21 |
| 2012/0290338 A1 | 11/2012 | Gascoigne |
| 2012/0296679 A1 | 11/2012 | Im |

(Continued)

FOREIGN PATENT DOCUMENTS

| | | |
|---|---|---|
| JP | H07-250186 | 9/1995 |
| JP | 2001-266010 | 9/2001 |

(Continued)

OTHER PUBLICATIONS

Japanese Office Action dated Mar. 28, 2018 filed in counterpart Japanese Patent Application No. 2015-147672 (6 pages) (with machine translation).

(Continued)

*Primary Examiner* — Mila Airapetian
(74) *Attorney, Agent, or Firm* — Kim & Stewart LLP

(57) ABSTRACT

A point of sale device according to an embodiment includes a storage unit, an input unit, a display, a communication interface, and a processor. The input unit receives an input of a customer identification code corresponding to a customer that is performing a transaction. The input unit also receives an input of one or more merchandise information codes each corresponding to a merchandise item that the customer has selected for purchase in the transaction. The processor retrieves, based on the input customer identification code, one or more merchandise reservation codes each corresponding to a merchandise item that the corresponding customer has previously reserved. The display provides a notification that the previously reserved merchandise item is available.

4 Claims, 11 Drawing Sheets

(56) References Cited

U.S. PATENT DOCUMENTS

| | | | | |
|---|---|---|---|---|
| 2014/0006206 A1* | 1/2014 | Scrivner | .............. | G06Q 10/083 |
| | | | | 705/26.8 |
| 2016/0171592 A1* | 6/2016 | Pugh | .................. | G06Q 30/0635 |
| | | | | 705/26.81 |
| 2016/0364790 A1* | 12/2016 | Lanpher | .............. | G06Q 30/0637 |
| 2016/0371689 A1* | 12/2016 | Brown | ................. | G06Q 20/405 |
| 2017/0024805 A1* | 1/2017 | Tepfenhart, Jr. | ... | G06Q 30/0635 |

FOREIGN PATENT DOCUMENTS

| | | |
|---|---|---|
| JP | 2003-132258 | 5/2003 |
| JP | 2008226180 A | 9/2008 |
| JP | 2010049434 A | 3/2010 |
| WO | 2014/109938 | 7/2014 |

OTHER PUBLICATIONS

Extended European Search Report dated Oct. 19, 2016 filed in counterpart European Patent Application No. 16180641.9 (7pages).
Japanese Office Action dated Oct. 23, 2018, mailed in counterpart Japanese Application No. 2015-147672, 8 pages (with translation).

* cited by examiner

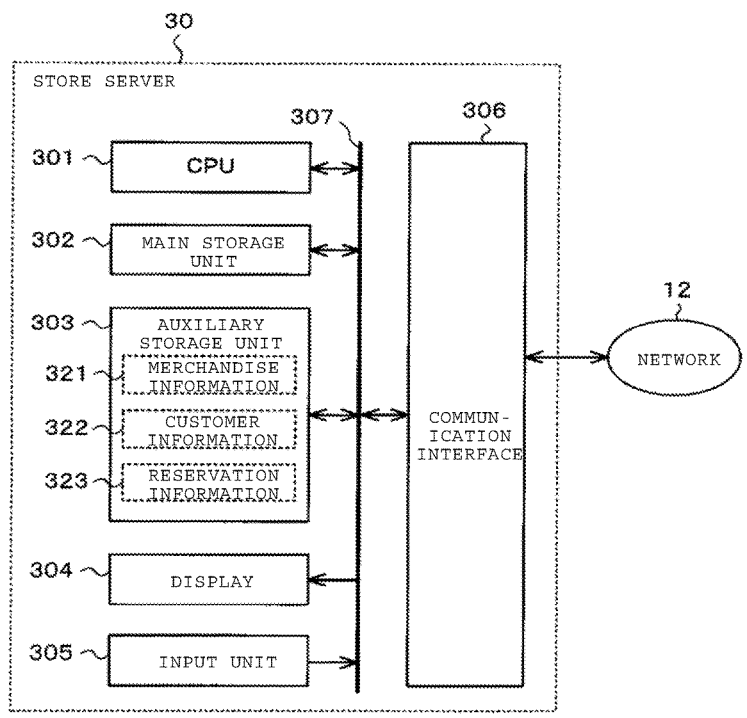

FIG. 6

CUSTOMER INFORMATION 322

| CUSTOMER IDENTIFICATION CODE | NAME | ADDRESS | PHONE NUMBER |
|---|---|---|---|
| ID00001 | AAAA | OO-SHI, OO-KEN, ... | 0... |
| ID00002 | BBBB | OO-SHI, OO-KEN, ... | 0... |
| ID00003 | CCCC | OO-SHI, OO-KEN, ... | 0... |
| ID00004 | DDDD | OO-SHI, OO-KEN, ... | 0... |

FIG. 7

RESERVATION INFORMATION 323

| CUSTOMER IDENTIFICATION CODE | MERCHANDISE IDENTIFICATION CODE |
|---|---|
| ID00101 | ID002 |
| ID00223 | ID004 |
| ID00223 | ID002 |
| ID00342 | ID001 |

FIG. 9

|  No | MERCHANDISE NAME | UNIT PRICE | QUANTITY | AMOUNT OF MONEY |
|---|---|---|---|---|
| 1 | X | 980 | 1 | 980 |
| 2 | Y | 1,500 | 2 | 3,000 |
|  |  |  |  |  |
|  |  |  |  |  |
|  |  |  |  |  |

RESERVATION SCREEN

B1: MERCHANDISE REGISTRATION END

TOTAL  3 PIECES  3,980

FIG. 11

| No | MERCHANDISE NAME | UNIT PRICE | QUANTITY | AMOUNT OF MONEY |
|----|------------------|------------|----------|-----------------|
| 1  | A                | 980        | 1        | 980             |
| 2  | B                | 360        | 1        | 360             |
|    |                  |            |          |                 |
|    |                  |            |          |                 |
|    |                  |            |          |                 |

MERCHANDISE REGISTRATION END

TOTAL | 2 PIECES | 1,340

FIG. 13

REGISTRATION SCREEN | TX1: THERE IS RESERVED MERCHANDISE — P2

| No | MERCHANDISE NAME | UNIT PRICE | QUANTITY | AMOUNT OF MONEY |
|---|---|---|---|---|
| 1 | A | 980 | 1 | 980 |
| 2 | B | 360 | 1 | 360 |
|  |  |  |  |  |
|  |  |  |  |  |
|  |  |  |  |  |

B2: MERCHANDISE REGISTRATION END

TOTAL | 2 PIECES | 1,340

FIG. 14

RESERVATION SCREEN — P3

| No | MERCHANDISE NAME | UNIT PRICE | QUANTITY | AMOUNT OF MONEY |
|---|---|---|---|---|
| 1 | X | 980 | 1 | 980 |
| 2 | Y | 1,500 | 2 | 3,000 |
|  |  |  |  |  |
|  |  |  |  |  |
|  |  |  |  |  |

B3: RETURN

TOTAL | 3 PIECES | 3,980

US 10,229,446 B2

PAYMENT APPARATUS, PAYMENT SYSTEM, AND PROGRAM

CROSS-REFERENCE TO RELATED APPLICATION

This application is based upon and claims the benefit of priority from Japanese Patent Application No. 2015-147672, filed Jul. 27, 2015, the entire contents of which are incorporated herein by reference.

FIELD

Embodiments described herein relate generally to a payment apparatus, a payment system, and a program.

BACKGROUND

Generally, a customer who enters a store such as a supermarket or a home center selects merchandise that he wishes to purchase, and performs settlement by using a point of sales (POS) terminal, thereby enabling the purchase of merchandise.

When there is merchandise that the customer wishes to order, or the merchandise that the customer reserves for purchase in advance, for example, the customer goes to a general counter such as a service counter which is provided in the store, and is able to separately purchase the desired merchandise. In such a case, generally, the customer goes to the general counter and purchases the reserved merchandise, for example, based on an arrival notification sent from the store, an arrival due date that is provided in advance, or the like. However, the customer entering the store may forget to retrieve the reserved merchandise, after purchasing other pieces of merchandise.

In addition, a system that notifies a customer of an arrival date of the reserved merchandise or an arrival due date of the reserved merchandise is proposed in the related art. However, the customer may forget that the merchandise has arrived when the customer enters the store, or the date when the customer enters the store may be the date of the notification.

DESCRIPTION OF THE DRAWINGS

FIG. 4 is a block diagram illustrating an example configuration of a store server.

FIG. 5 is a diagram schematically illustrating merchandise information.

FIG. 6 is a diagram schematically illustrating customer information.

FIG. 7 is a diagram schematically illustrating reservation information.

FIG. 9 is a diagram illustrating an example reservation screen.

FIG. 11 is a diagram illustrating an example registration screen.

FIG. 13 is a diagram illustrating the registration screen together with a text.

FIG. 14 is a diagram illustrating an example screen that displays merchandise information on reserved merchandise.

DETAILED DESCRIPTION

According to an exemplary embodiment, a customer who enters a store is provided with timely information regarding reserved merchandise.

A point of sale device according to an embodiment includes a storage unit, an input unit, a display, a communication interface, and a processor. The input unit receives an input of a customer identification code corresponding to a customer that is performing a transaction. The input unit also receives an input of one or more merchandise information codes each corresponding to a merchandise item that the customer has selected for purchase in the transaction. The processor retrieves, based on the input customer identification code, one or more merchandise reservation codes each corresponding to a merchandise item that the corresponding customer has previously reserved. The display provides a notification that the previously reserved merchandise item is available.

Figure 1:
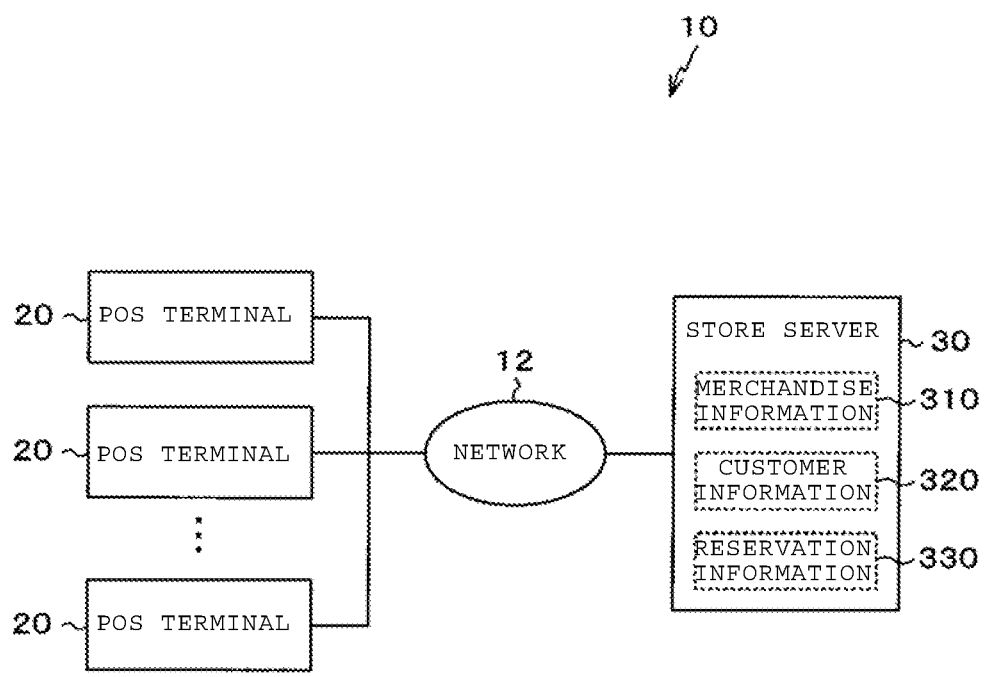
FIG. 1 is a block diagram illustrating an example configuration of a POS system according to an embodiment.

The present embodiment will be described with reference to the drawings. FIG. 1 is a block diagram illustrating an example configuration of a POS system 10 which is a payment system. As illustrated in FIG. 1, the POS system 10 includes a plurality of POS terminals 20 and a store server 30 which are connected to each other through a network 12 such as a local area network (LAN) or the Internet.

Figure 2:
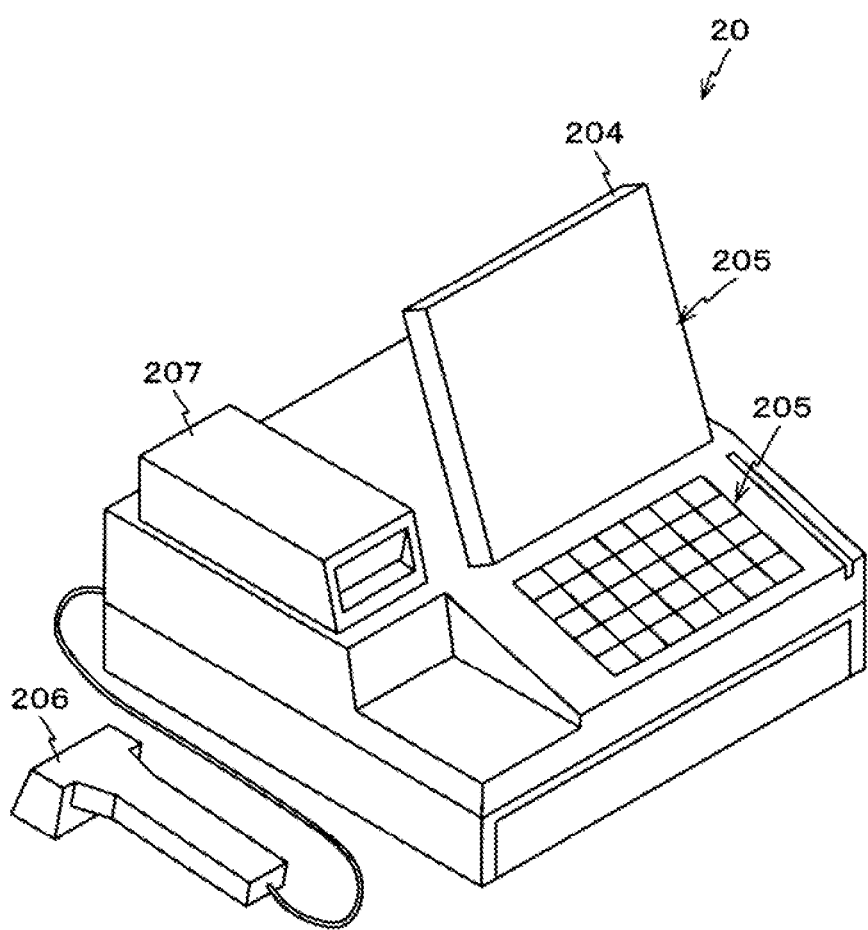
FIG. 2 is a perspective view of a POS terminal.
Figure 3:
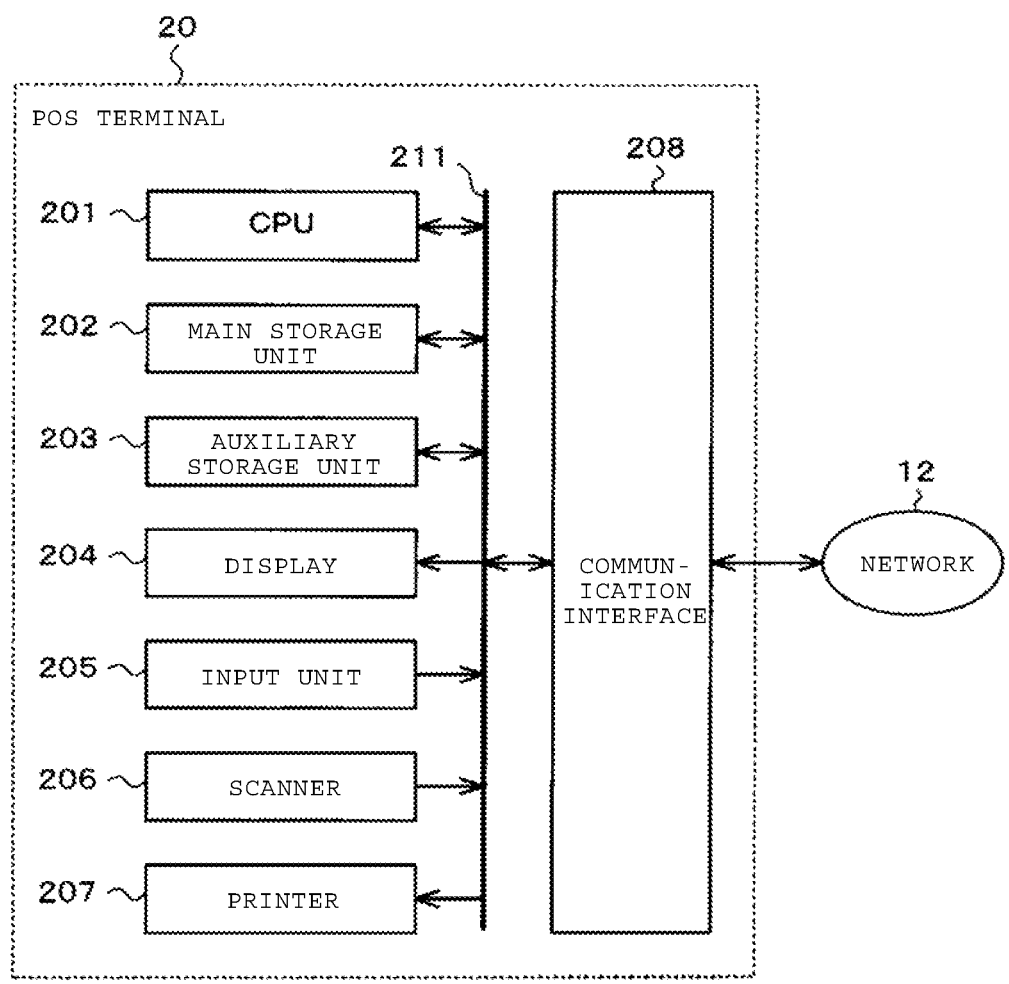
FIG. 3 is a block diagram illustrating an example configuration of the POS terminal.

FIG. 2 is a perspective view illustrating an example of the POS terminal 20. FIG. 3 is a block diagram illustrating an example configuration of the POS terminal 20. The POS terminal 20 is, for example, a terminal that is provided at a cash counter of a supermarket or the like. The POS terminal 20 includes a central processing unit (CPU) 201, a main storage unit 202, an auxiliary storage unit 203, a display 204, an input unit 205, a scanner 206, a printer 207, a communication interface 208, and a system bus 211 that connects the respective units to each other.

The CPU 201 reads and executes a program stored in the auxiliary storage unit 203. The specific operation of the CPU 201 will be described later.

The main storage unit 202 includes a volatile memory such as a random access memory (RAM). The main storage unit 202 is used as a working region of the CPU 201.

The auxiliary storage unit 203 includes a non-volatile memory such as a read only memory (ROM), a magnetic disk, and a semiconductor memory. The auxiliary storage unit 203 stores programs that the CPU 201 executes, and various parameters. Further, the auxiliary storage unit 203 sequentially stores information including the processing result of the CPU 201.

The display 204 includes a display unit such as a liquid crystal display (LCD). The display 204 displays an image or the like generated by the CPU 201 that executes the program.

The input unit 205 includes operation buttons such as a keyboard or number pad, and a touch panel attached to the display 204. The display 204 and the input unit 205 function together to provide a graphical user interface (GUI). Therefore, the salesperson (operator) is able to input various instructions to the CPU 201 by pressing the operation buttons, or touching the icons or buttons which are displayed on the display 204 through a touch panel. The scanner 206 reads an identification code such as a barcode or a QR code that is provided on a card that a customer or a salesperson possesses, on merchandise, or on a tag of the merchandise. The scanner 206 outputs the read result as electronic data.

The operation buttons, the touch panel, and/or the scanner 206 may function as the input unit 205.

The printer 207 prints information on a sheet such as a roll sheet so as to generate a receipt. For example, an image forming apparatus such as a thermal printer or a dot printer may be used as the printer 207.

The communication interface 208 includes a LAN interface, a serial interface, a parallel interface, and the like. The POS terminal 20 is connected to the network 12 through the communication interface 208.

FIG. 4 is a block diagram illustrating an example of a store server 30. As illustrated in FIG. 4, the store server 30 includes a CPU 301, a main storage unit 302, an auxiliary storage unit 303, a display 304, an input unit 305, a communication interface 306, and a system bus 307 that connects the respective units to each other.

The CPU 301 reads and executes a program stored in the auxiliary storage unit 303.

The main storage unit 302 includes a volatile memory such as a RAM. The main storage unit 302 is used as a working area for the CPU 301.

The auxiliary storage unit 303 includes a non-volatile memory such as a ROM, a magnetic disk, and a semiconductor memory. The auxiliary storage unit 303 stores a program that the CPU 301 executes, merchandise information 321, customer information 322, reservation information 323, and the like. The auxiliary storage unit 303 also stores other information such as processing results from the CPU 301.

FIG. 5 is a diagram schematically illustrating the merchandise information 321. As illustrated in FIG. 5, the merchandise information 321 includes, for example, information indicating a merchandise identification code, a merchandise name, a weight, and a unit price. The merchandise identification code is a code assigned to each piece of merchandise. The merchandise identification code is a unique alphanumeric code. The merchandise name is the name of the merchandise. The weight is the weight of the merchandise. The unit price is the price per unit of the merchandise.

The merchandise identification code, the merchandise name, the weight, and the unit price, which are included in the merchandise information 321, are stored in association with each other. When the merchandise identification code indicated by the barcode on the merchandise or the like is read by using the scanner 206, the POS terminal 20 acquires the merchandise information 321 from the store server 30 and stores the merchandise information in the main storage unit 202.

FIG. 6 is a diagram schematically illustrating the customer information 322. As illustrated in FIG. 6, the customer information 322 includes, for example, information indicating a customer identification code, a name, an address, and a phone number. The customer identification code is assigned to each customer who uses the store. The customer identification code is a unique alphanumeric code. The customer identification code is assigned to each customer, for example, when the customer is registered as the member of the store. A membership card is assigned to the customer, and on the membership card is a barcode or the like indicating the customer identification code.

The customer identification code is associated with the name, the address, and the phone number of the customer. Therefore, for example, when the customer identification code is acquired by reading the barcode or the like from the membership card, it is possible to obtain the name, the address, and the phone number of the customer to which the customer identification code is assigned, from the customer information 322.

FIG. 7 is a diagram schematically illustrating the reservation information 323. As illustrated in FIG. 7, the reservation information 323 includes, for example, information including the customer identification code and the merchandise identification code. The customer identification code and the merchandise identification code are stored in association with each other. Therefore, when a customer identification code is acquired, for example, by reading a barcode from the membership card, it is possible to obtain a merchandise identification code associated with the customer identification code, from the reservation information 323.

Returning to FIG. 4, the display 304 includes a display unit such as a LCD. The display 304 displays an image that is generated by the CPU 301 in accordance with a program.

The input unit 305 includes a keyboard, and a pointing device such as a mouse. Input from the operator (salesperson) is received through the input unit 305, and is provided to the CPU 301 through the system bus 307.

The communication interface 306 includes a LAN interface, a serial interface, a parallel interface, and the like. The store server 30 is connected to the network 12 through the communication interface 306.

Next, the operation of the POS system 10 will be described. The POS system 10 performs a reservation process for reserving purchase of merchandise which is not present in the store, and a payment process for paying for merchandise which is present in the store.

Figure 8:
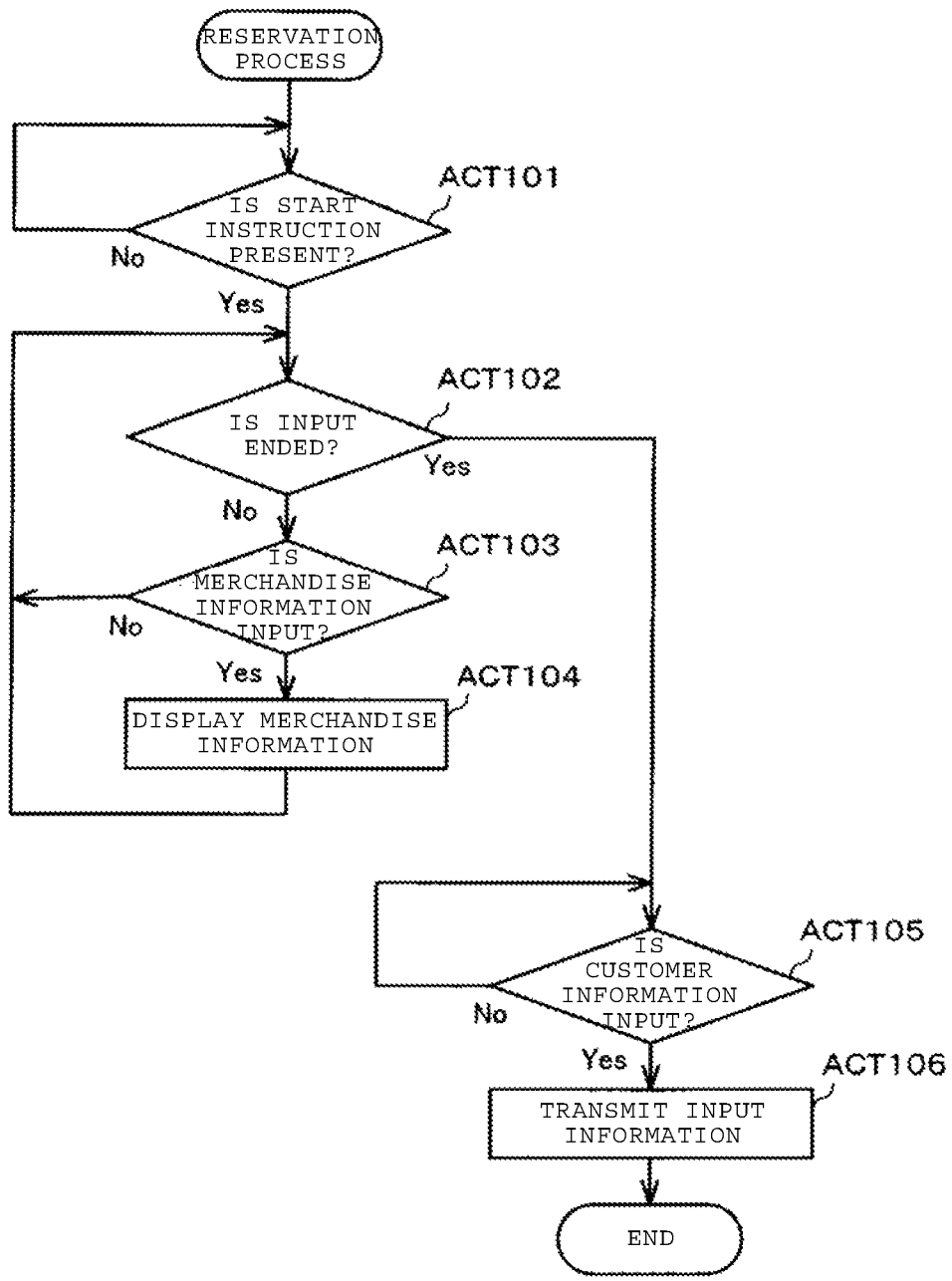
FIG. 8 is a flowchart illustrating an example sequence of operations for a reservation process.

FIG. 8 is a flowchart illustrating an example sequence of operations for the reservation process. The flowchart illustrates a series of processes that the CPU 201 of the POS terminal 20 executes.

In the reservation process, first, the CPU 201 waits for a reservation process start instruction to start the reservation process (ACT101). The operator of the POS terminal 20 can input the reservation process start instruction to the POS terminal 20, for example, by touching a reservation process start button or the like displayed on the display 204.

When it is determined that the reservation process start instruction is input (Yes at ACT101), the CPU 201 displays a screen P1 illustrated in FIG. 9 on the display 204. The screen P1 includes a button B1 for ending the input of the merchandise to be reserved and a table representing the merchandise name, the unit price, the quantity, and the amount of money of the merchandise to be reserved.

Next, the CPU 201 determines whether or not the button B1 illustrated in FIG. 9 is touched (ACT102). When it is determined that the button B1 is not touched (No at ACT102), the CPU 201 waits for input of the merchandise information 321 indicating the merchandise to be reserved (ACT103).

The merchandise information 321 is input, for example, by the merchandise name being directly input to the POS terminal 20, or, the scanner 206 scanning the barcode indicating the merchandise identification code, or the like.

If the merchandise information 321 is not input (No at ACT103), the CPU 201 returns to ACT102. If the merchandise information 321 is input (Yes at ACT103), the CPU 201 reads out the merchandise information 321 stored in the auxiliary storage unit 303 of the store server 30, with the merchandise name or the merchandise identification code, as an index. As illustrated in FIG. 9, the name, the unit price, and the like of the merchandise included in the merchandise information 321 are displayed (ACT104).

For example, when the name "X" of the merchandise X or the merchandise identification code of the merchandise X is input (Yes at ACT103), the merchandise information 321 such as the merchandise name, the unit price, and the amount of money of the merchandise X is read out and displayed (ACT104).

When the process of ACT104 is completed, the CPU 201 returns to the ACT102. If the button B1 is touched in ACT102 (Yes at ACT102), the CPU 201 waits for the input of the customer information 322 (ACT105).

The customer information 322 is input, for example, by the scanner 206 scanning the barcode or the like described on a membership card that the customer possesses. Further, when the customer does not possess a membership card, for example, it is considered that the name of the customer and the number of a slip that is used in the reservation transaction can be input.

When the customer identification code is input (Yes at ACT105), the CPU 201 transmits the customer identification code in association with the merchandise identification code indicating the reserved merchandise, to the store server 30 (ACT106), and ends the reservation process. With the above series of processes, the reservation information 323 illustrated in FIG. 7 is generated.

Figure 10:
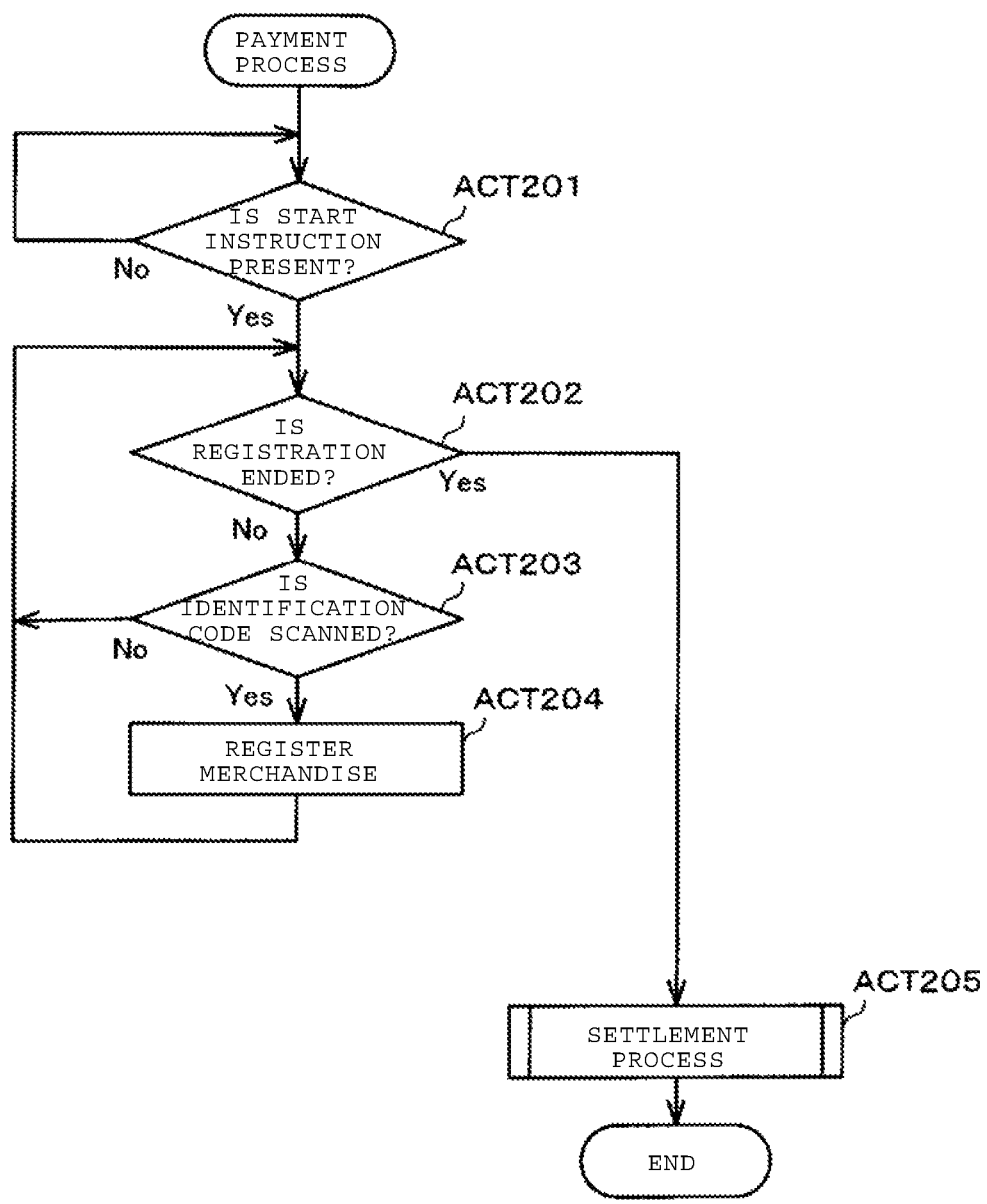
FIG. 10 is a flowchart illustrating an example sequence of operations for a payment process.

Next, the payment process that the CPU 201 of the POS terminal 20 executes will be described. FIG. 10 is a flowchart illustrating an example sequence of operations for the payment process. The flowchart illustrates a series of processes that the CPU 201 of the POS terminal 20 executes.

In the payment process, first, the CPU 201 waits for a payment process start instruction to start the payment process (ACT201). The operator of the POS terminal 20 can input a payment process start instruction to the POS terminal 20, for example, by touching a payment process start button or the like displayed on the display 204.

When it is determined that the payment process start instruction is input (Yes at ACT201), the CPU 201 displays a screen P2 illustrated in FIG. 11 on the display 204. The screen P2 displays the merchandise information 321 of the merchandise to be paid for. A button B2 for ending the registration of the merchandise, and a table representing the merchandise name, the unit price, the quantity, and the amount of money of the merchandise to be reserved are displayed on the screen P2.

Next, the CPU 201 determines whether or not the button B2 illustrated in FIG. 11 is touched (ACT202). When it is determined that the button B2 is not touched (No at ACT202), the CPU 201 waits for the scanning of the merchandise identification code provided in the merchandise that the customer desires to purchase (ACT203).

If the merchandise identification code is not scanned (No at ACT203), the CPU 201 returns to Act202. If the merchandise identification code is scanned, electronic data indicating the merchandise identification code is output from the scanner 206. When the electronic data output from the scanner 206 is received, the CPU 201 determines that the merchandise identification code is scanned (Yes at ACT203), and registers the merchandise (ACT104).

Specifically, the CPU 201 reads out the merchandise information 321 stored in the auxiliary storage unit 303 of the store server 30, with the merchandise identification code indicated in the electronic data which is received from the scanner 206, as an index. The name, the quantity, and the unit price of the merchandise, and the payment amount of money, included in the merchandise information 321, are stored in the main storage unit 202 of the POS terminal 20 as the merchandise to be paid for. In addition, the CPU 201 displays the name, the quantity, and the unit price of the merchandise, and the payment amount of money, which are registered, on the display 204.

When the registration of merchandise is ended, the CPU 201 returns to ACT202. In Act202, when the button B2 is touched (Yes at ACT202), the CPU 201 performs the settlement process (ACT205). In the settlement process, a series of processes illustrated in the subroutine of FIG. 12 are executed.

Figure 12:
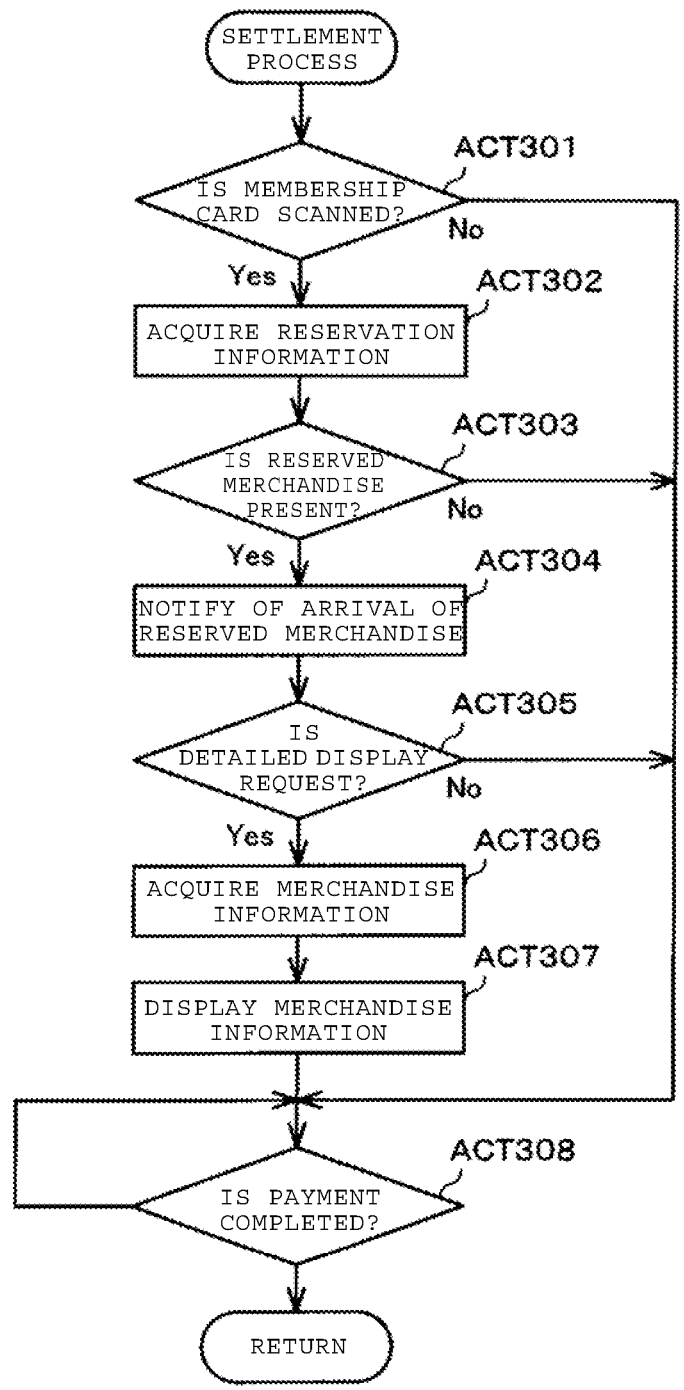
FIG. 12 is a flowchart illustrating an example sequence of operations for a settlement process.

As illustrated in FIG. 12, the CPU 201 waits for the scanning of the membership card (ACT301). When the membership card is scanned, electronic data indicating the customer identification code is output from the scanner 206. When the electronic data that is output from the scanner 206 is received, the CPU 201 determines that the membership card is scanned (Yes at ACT301). Then, the CPU 201 searches for the reservation information 323, with the merchandise identification code indicated in the membership card as an index. The CPU 201 acquires the merchandise identification code corresponding to the customer identification code indicated in the membership card that was scanned.

As can be seen with reference to FIG. 7, for example, when the customer identification code indicated in the barcode of the membership card is "ID00223", the CPU 201 acquires the merchandise identification codes "ID004" and "ID002" corresponding to the customer identification code "ID00223".

Next, when the merchandise identification code corresponding to the customer identification code is included in the reservation information 323 (Yes at ACT303), the CPU 201 provides a notification that the reserved merchandise is already arrived (ACT304). As illustrated in FIG. 13, for example, the notification may be a text TX1 on the display 204 indicating "There is reserved merchandise." The text TX1 displayed on the display 204 is highlighted, for example, by being popped-up on the screen P2, or being flashed.

Next, the CPU 201 waits for a detailed display request for information related to the reserved merchandise (ACT305). The detailed display request can be input to the POS terminal 20, for example, by touching the text TX1 displayed on the display 204, or the like. When the detailed display request is received (Yes at ACT305), the CPU 201 searches for the merchandise information 321 illustrated in FIG. 5, with the merchandise identification code as an index, to acquire the merchandise name, the unit price, and the like of the corresponding merchandise. For example, when the merchandise identification code is "ID002", the merchandise information 321 such as the merchandise name "B" and the unit price "OO Yen" is acquired.

The CPU 201 displays the acquired merchandise information 321 (ACT307). FIG. 14 is a diagram illustrating a screen P3 for displaying the merchandise information 321. A button B3 for ending the display of the merchandise information, and a table representing the merchandise name, the unit price, the quantity, and the amount of money of the reserved merchandise are included in the screen P3. The CPU 201 displays the acquired merchandise information 321 as the screen P3. Thus, the operator of the POS terminal 20 can check the arrival of the reserved merchandise, and detailed information about the reserved merchandise, through the display 204. Incidentally, after the checking of the screen P3 is ended, for example, it is possible to exit the screen P3 by touching the button B3.

Next, the CPU 201 waits for the completion of the payment (ACT308). When the payment is completed between the operator of the POS terminal 20 and the customer, the CPU 201 ends the settlement process.

Similarly, if the membership card is not scanned in ACT301 (No at ACT301), if the merchandise identification code corresponding to the customer identification code is not included in the reservation information 323 in ACT303 (No at ACT303), or if the detailed display request is skipped in ACT305 (No at ACT305), the CPU 201 waits for the completion of the payment (ACT308). Then, when the completion of the payment by the operator is notified, the CPU 201 ends the settlement process. Since the settlement process is completed, the payment process is completed (ACT205).

As described above, in the POS system 10 according to the present embodiment, when a customer enters a store and pays for merchandise, when the customer identification code of the customer is specified, the merchandise that the customer reserved can be identified based on the customer identification code, and search results are displayed on the POS terminal 20. Thus, it is possible to notify the customer who is shopping that the purchase of the reserved merchandise is possible. Moreover, the notification is provided at a convenient timing, that is, when the shopper is performing a purchase transaction of other merchandise. Therefore, it is possible to prevent the customer from forgetting to receive the reserved merchandise, or having to return to the store again to purchase the reserved merchandise.

Hitherto, the exemplary embodiment is described, but is not intended to be limited by the above embodiment. For example, in the above embodiment, when the membership card is scanned in the settlement process (ACT301), the reservation information is acquired (ACT302). Without being limited thereto, the customer identification code may be input, for example, through the input unit 205 of the POS terminal 20, and the reservation information may thereafter be acquired.

The above embodiment describes the case where the merchandise information 321 indicating the reserved merchandise is displayed on the display 204 of the POS terminal 20. Without being limited thereto, a display enabling the customer's easy viewing may be separately provided in the POS terminal 20 or the like, and the merchandise information 321 related to the reserved merchandise may be displayed on the display. In this case, it becomes easy for the customer to check the presence or absence of reserved merchandise.

In the above embodiment, it is assumed that the merchandise information 321, the customer information 322, and reservation information 323 are stored in the store server 30. Without being limited thereto, the merchandise information 321, the customer information 322, and the reservation information 323 may be stored in the POS terminal 20.

In the above embodiment, when a reserved merchandise is available, as illustrate in FIG. 13, the text TX1 indicating the arrival of the reserved merchandise is displayed on the display of the POS terminal 20 (ACT304). Without being limited thereto, for example, the arrival of the reserved merchandise may be provided as an audio notification by using a speaker included in the POS terminal 20, or may be provided through both the text TX 1 and voice.

Further, the screen P3 is an example. Insofar as it is possible to recognize the reserved merchandise, it is possible to notify the merchandise information 321 in any display mode.

The above embodiment describes a case where the reservation process, the payment process, and the settlement process illustrated in the flowcharts of FIG. 8, FIG. 10, and FIG. 12 are executed, by the CPU 201 of the POS terminal 20 executing the program stored in the auxiliary storage unit 203. Without being limited thereto, the POS terminal 20 may be realized by dedicated hardware.

The program stored in the auxiliary storage unit 203 may be stored and distributed in a computer-readable recording medium such as a flexible disk, a compact disk read-only memory (CD-ROM), a digital versatile disk (DVD), and a magneto-optical disk (MO), and installed in a computer.

Further, the program may be stored in a disk device or the like included in a predetermined server device on a communication network such as the normal Internet, or may be downloaded as needed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A point of sale (POS) terminal at a retail location, comprising:
   a storage unit storing a program;
   an input unit including buttons to be operated by an operator of the POS terminal;
   a display for displaying information to the operator during a sales transaction;
   a scanner to read code information from items of merchandise in the sales transaction and customer identification code information for a customer in the sales transaction;
   a communication interface configured to connect to a store server; and
   a processor configured by execution of the program from the storage unit to:
     receive an input of a customer identification code from the input unit or the scanner during the sales transaction,
     receive code information read from the items of merchandise in the sales transaction by the scanner or input by the operator via the input unit,
     retrieve any merchandise reservation codes associated with the customer identification code from the store server for each merchandise item that the customer has previously reserved, and
     before completion of a settlement process for the sales transaction, provide a notification on the display, based on the retrieval of one or more merchandise reservation codes associated with the customer identification code, that a previously reserved merchandise item is available for pick up at the retail location.

2. The terminal according to claim 1, wherein the input unit is at least one of a number pad and a touch panel.

3. A payment system for a retail location, comprising:
a server having:
  a server communication interface,
  a server processor, and
  a reservation database including customer information codes stored in association with reserved merchandise information codes that each correspond to a merchandise item that a customer corresponding to the associated customer information code has previously reserved, wherein
  the sever processor controls the storage unit and the server communication interface to: receive a customer information code and transmit any reserved merchandise information codes that are stored in association with the customer information code in the reservation database; and
a point of sale (POS) terminal having:
  a storage unit storing a program;
  an input unit including buttons to be operated by an operator of the POS terminal;
  a display for displaying information to the operator during a sales transaction;
  a scanner to read code information from items of merchandise in the sales transaction and customer identification code information for a customer in the sales transaction;
  a communication interface configured to connect to a store server; and
  a processor configured by execution of the program from the storage unit to:
  receive an input of a customer identification code from the input unit or the scanner during the sales transaction,
  receive code information read from the items of merchandise in the sales transaction by the scanner or input by the operator via the input unit,
  retrieve any merchandise reservation codes associated with the customer identification code from the store server for merchandise item that the customer has previously reserved, and
  before completion of a settlement process for the sales transaction, provide a notification on the display, based on the retrieval of one or more merchandise reservation codes associated with the customer identification code, that a previously reserved merchandise item is available for pick up at the retail location.

4. The payment system according to claim 3, wherein the input unit is at least one of a number pad and a touch panel.

* * * * *